Sept. 30, 1952  W. I. EVANS  2,612,184
SENSITIVE HYDRAULIC TRACER VALVE
Filed Jan. 14, 1949

INVENTOR.
WENDELL I. EVANS
BY
H. H. Parsons & C. W. Wright,
ATTORNEYS

Patented Sept. 30, 1952

2,612,184

UNITED STATES PATENT OFFICE 2,612,184

SENSITIVE HYDRAULIC TRACER VALVE

Wendell I. Evans, Cincinnati, Ohio, assignor to The Cincinnati Milling Machine Co., Cincinnati, Ohio, a corporation of Ohio Application January 14, 1949, Serial No. 70,998

7 Claims. (Cl. 137—619)

This invention relates to improvements in control valve mechanisms and more particularly of the type which control the rate of movement of a given part in accordance with the amount of displacement of the valve.

In the art of control valves utilized in hydraulic systems for controlling actuation of a movable part such as relative movement between a piston and its cylinder there are valves which simply have an open position and a closed position, such as start and stop valves, and simple reversing valves, and then there are valves which are intended to be opened variable amounts to produce a rate of movement in accordance with the amount that the valve is opened and therefore are in the nature of rate control valves.

It is well known that in the design of valves for controlling rate of movement in accordance with the displacement of the valve that the hydraulic conditions existing at the valve for very slow rates of movement are entirely different from the conditions existing for high rates of movement. Therefore, it has been very difficult to design a single valve satisfactory for both conditions. This is especially true in sensitive valves which are subject to continuous adjustment such as in tracer controlled valves which usually have a neutral position for holding the controlled device against movement, and subject to continuous adjustment to opposite sides of this position for causing reversible operation of the actuable mechanism at variable rates because such continuous adjustment tends to create objectionable oscillation in the actuated part.

It is, therefore, an object of this invention to provide an improved sensitive control valve means which will operate satisfactorily for causing fast or slow movements without creating objectionable oscillation.

Another object of this invention is to provide an improved sensitive control valve of the character described which can be operated continuously to produce slow rates of movement in opposite directions without setting up objectionable oscillations.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from the spirit of the invention.

In the drawings in which like reference numerals indicate like or similar parts:

Figure 1:
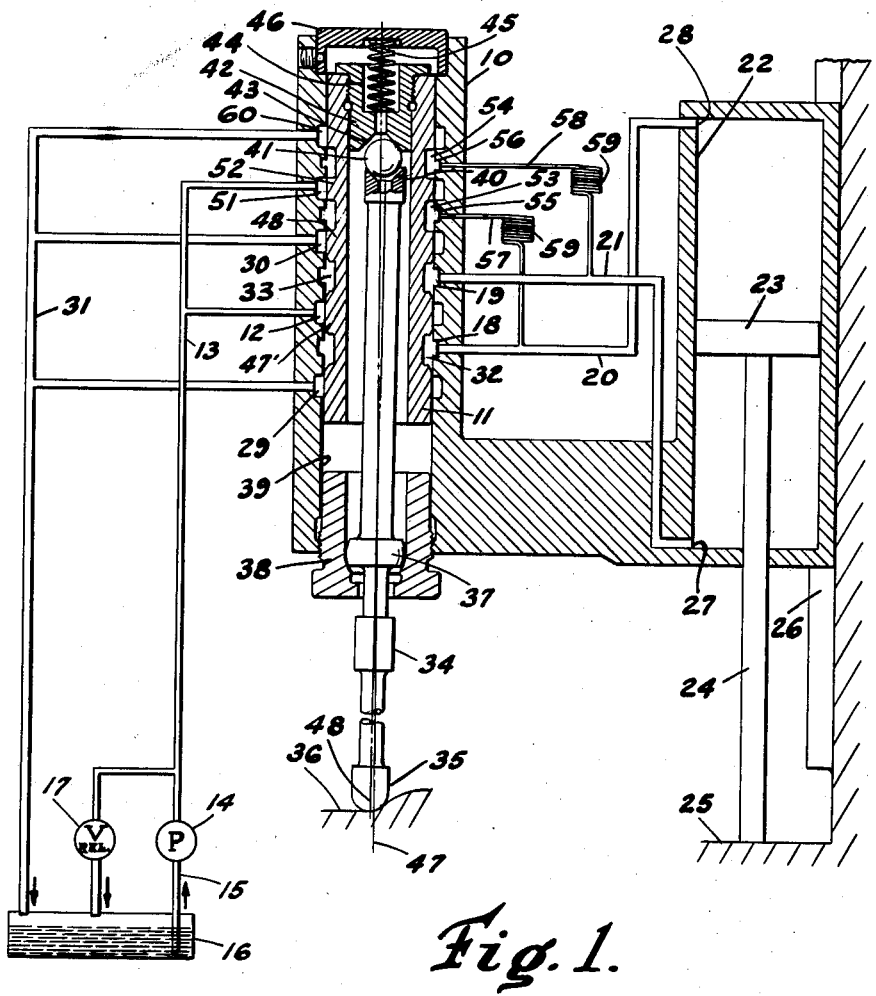
Figure 1 is a view of a control valve mechanism and circuit connections thereto embodying the principles of this invention.

In Figure 1 of the drawings the reference numeral 10 indicates in general a valve housing having a valve plunger 11 slidably mounted therein. The valve housing has a pressure port 12 in the form of an internal annular groove, and this groove is connected by a channel 13 to a suitable source of pressure such as supply pump 14 which has an intake 15 through which fluid is withdrawn from a reservoir 16 and delivered under pressure to the line 13. A suitable relief valve 17 may be connected to the line 13 to regulate the pressure in the line 13.

The valve housing also has a pair of motor ports 18 and 19 which are directly connected by channels 20 and 21 respectively to opposite ends of a hydraulic motor in the form of a cylinder 22 having a contained piston 23, the piston being connected by a piston rod 24 to a fixed support 25. For illustrative purposes, the cylinder forms part of the housing 10 and the entire structure is guided for movement on guideways 26 formed on the fixed support 25 and relative to the fixed piston 23. Therefore, if hydraulic pressure were admitted through port 27 to the cylinder 22, the structure, including the valve housing and cylinder, would move down as viewed in Figure 1; or if pressure were admitted to port 28 the structure would move up as viewed in this figure.

The valve housing 10 is also provided with a pair of exhaust ports 29 and 30 which are also in the form of annular grooves, and these ports are connected to a common return channel 31 which returns the fluid to the reservoir. It will now be obvious that if the valve member 11 were moved up from the position shown, the annular groove 32 formed in the valve member would interconnect port 12 with port 18 to cause admission of pressure to the line 20, while the line 21 would be connected by the annular groove 33 in the valve member 11 to the exhaust port 30. On the other hand, if the valve member 11 were moved down, from the position shown in Figure 1, the port 18 would be connected to the exhaust port 29, and the pressure port 12 would be connected to motor port 19 to cause admission of pressure to the lower end of cylinder 22.

As illustrative of a valve which may be subjected to continuous movement, it is shown here in connection with a tracer mechanism in which the position of the valve depends upon the position of the tracer. The tracer is indicated by the reference numeral 34 and the tracer contact portion 35 is adapted to engage and follow the contoured surface of a pattern which has been indicated generally by the reference numeral 36. In order to be subject to universal movement the tracer 34 is supported by a ball portion 37 in a tracer supporting member 38 which is threaded into the housing 10 in axial alignment with the bore 39 in which the valve plunger 11 slides.

The upper end of the tracer is provided with a conical-shaped depression 40 for receiving a ball 41, which is interposed between the tracer and a member 42 threaded in the end of valve 11 which has a similar conical-shaped depression 43 formed in the end thereof. The member 42 has a socket 44 formed in the end thereof in which is mounted a spring 45 which abuts a cap 46 attached to the valve housing 10. The spring 45 continuously urges the member 44 and connected valve member 11 downward as viewed in Figure 1, attempting to centralize the ball 41 in the conical sockets and thereby hold the axis of the tracer member parallel to the axis of movement of the valve plunger.

When the tracer is in engagement with the pattern, the tracer is held by the pattern in a deflected position with respect to a vertical axis 47, as, for instance, in the angular position indicated by the axis 48, and the parts are so adjusted that there is a deflected position in which the valve plunger 11 is held in a neutral position which is the position shown in Figure 1. It should now be obvious that as the deflection of the tracer is varied by the pattern 36, that it would cause movement of the valve plunger 11 up or down, and thereby continuously reverse the flow of pressure to opposite ends of the cylinder 22. It will be obvious that an upward movement of the tracer valve 11 by the tracer from the position shown would cause a flow of fluid pressure to the upper end of the cylinder 22, and thereby cause the cylinder and valve housing 10 to move upward, thus following up movement of the valve plunger 11, and reposition the parts in a neutral position again. An automatic control is thus obtained.

It has been found that if the valve spools, such as the spool 47' opposite pressure port 12, is made the same width as the width of the port or annular groove it controls, a very sharp or sensitive control is obtained because the slightest movement of the valve plunger in either direction will effect a differentiation of pressure in the opposite ends of the cylinder, and although it is desirable to have a sensitive control yet such a control tends to set up an undesirable oscillation.

In order to overcome this oscillation, the spools are made slightly wider than the ports which they control. This is shown more particularly in Figure 2 in which the reference numeral 48 indicates the valve spool opposite the port 30, and it will be noted that the spool overlaps the lower edge 49 of the port groove, the overlap being indicated by the reference numeral 50.

Figure 2:
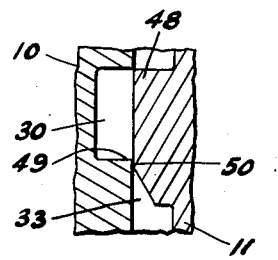
Figure 2 is a detail view of the construction existing at one of the valve ports.

In other words, the valve plunger 11, as viewed in Figure 2, must be moved upward by the amount of overlap 50 before the port is cracked open to permit a definite flow therethrough. Such an overlap, however, cuts down the sensitivity of the valve and the control exercised thereby. Therefore, additional means have been provided in combination with the valve to establish a definite flow for small movements of the valve. To this end the valve housing is provided with an additional pressure port 51 in the form of an annular groove, and this port is connected as shown to the supply line 13.

The valve plunger 11 is provided with a spool 52 which is of the same width as the port groove 51 whereby a very small movement of the valve, either upward or downward will cause a flow from the groove 51 to either the valve groove 53 or the valve groove 54. The housing has an additional pair of ports 55 and 56 which are in constant communication with the grooves 53 and 54 respectively, and these ports are connected by channels 57 and 58 to the motor lines 20 and 21 respectively.

Each line 57 and 58 has serially arranged therein a resistance 59 which may be in the form of a coil of tubing. The valve housing is provided with an exhaust port 60 for connecting the annular groove 54 to exhaust. It will now be seen that from this arrangement a slight upward movement of the valve plunger will connect the pressure port 51 to the line 57 and thereby cause a flow to the line 20, or vice versa, a slight downward movement will connect the pressure port 51 to the line 58, and thereby to the line 21. However, any attempt at oscillation will be damped by the resistances 59 so that slight upward and downward movements of the valve which would normally tend to set up oscillation are damped by the resistances.

The resistances are of such a nature that the rate of continuous flow therethrough is small, and this is sufficient for very small movements of the valve, but should the valve be given a sustained movement in either direction, then additional fluid is supplied by the main portion of the valve from the pressure port 12. Therefore, an arrangement is provided whereby one set of ports and connections take care of small movements of the valve without causing oscillation, and greater rates of flow are provided for by the other part of the valve in which the fluid is not required to flow through resistances.

There has thus been provided an improved valve mechanism which is sensitive to small movements to provide a pressure differential in the cylinder 22 sufficient to cause small movements but in a sufficiently delayed manner that violent oscillation will not be set up. This does not interfere with control of the main valve which is responsive to greater movements and once the connections are made thereby the fluid may flow more freely due to the fact that it does not have to pass through the resistances. Therefore, by the combination of the two sets of connections an improved sensitive valve mechanism is obtained.

What is claimed is:

1. In a sensitive control valve mechanism, the combination of a housing having a first and a second pressure port, a valve member movable in said housing having independent means for normally simultaneously closing each of said ports, said means being jointly movable with said valve member, one of said means being responsive to incipient movement of the valve member for variably opening the first pressure port, the other means being responsive to sustained movement of the valve member for sequentially variably opening the second port, said valve housing having a first and a second sequentially arranged outlet port for receiving respectively the flow from said first and second pressure ports, a delivery line connected to the outlet port receiving flow from the second pressure port and fluid resistance means connecting the other outlet port to said delivery line, and a tracer carried by the housing and operatively coupled with said valve member continuously to determine the movement thereof with respect to the housing.

2. In a sensitive control valve mechanism for controlling hydraulic actuation of a motor, the combination of a valve housing having a pair of pressure ports, a first pair of outlets associated with the first pressure port, a second pair of outlets associated with the second pressure port, a valve, slidably mounted in said housing, having means for normally simultaneously closing the respective pressure ports, one of said means being responsive to incipient movement of the valve member to establish a flow connection between the first of said pressure ports and one of said first pair of outlet ports, resistance means connecting said first pair of outlet ports to flow channels, other means on said valve member responsive to sustained movement of the valve member for subsequently connecting said second pressure port to one of the last-named pair of outlet ports, said last-named pair of outlet ports being connected directly to said flow channels.

3. In a sensitive control valve mechanism, the combination of a valve housing and a valve member movable in said housing, said housing having two ports parallel connected, one directly and the other by resistance means to a first channel, and two more ports parallel connected, one directly and the other by resistance means to a second channel, said valve housing also having two pressure ports and at least one exhaust port, means on the valve normally simultaneously closing the pressure port supplying the resistance connected ports and responsive to incipient movement of the valve for alternatively connecting said resistance connected ports to pressure and exhaust, other means on said valve normally simultaneously closing the other pressure port and responsive to sustained movement of the valve to alternatively connect the pressure port to one or the other of the direct connected ports.

4. In a sensitive control valve mechanism, the combination of a valve housing having a pair of pressure ports, a valve member having spool portions closing said ports when in a central position and movably mounted in said housing to position the edges of the spools to either side of said ports, said housing having two ports parallel connected to a first channel and two ports parallel connected to a second channel, one of each of said two ports being directly connected and the other resistance connected to its respective channel, one of the spool portions being on the valve responsive to incipient movement of the valve to either side of said central position for alternatively connecting one of said pressure ports to one of said resistance connected ports, and the other of said spool portions on said valve being so related to first spool portion that on sustained movement of the valve it will alternatively connect the other pressure port to one or the other of said direct connected ports.

5. In a sensitive control valve mechanism, the combination of a valve housing having two pressure ports formed therein, a valve member slidably mounted in said housing having a first spool for closing one of said pressure ports, said spool being of the same size as the said one of the pressure ports whereby incipient movement of the valve in either direction will open said one of the pressure ports, a second spool on said valve for closing the other pressure port but being greater in size than the latter pressure port, thus requiring a sustained movement of the valve in either direction to effect opening of said latter port, a first pair of outlet ports for alternatively receiving the flow from the first pressure, a second pair of outlet ports for alternatively receiving the flow from the other pressure port, said second pair of ports being directly connected to a pair of channels, and resistance means connecting each of the first pair of outlet ports in one of the respective channels.

6. In a sensitive control valve mechanism, the combination of a housing having a pair of pressure inlets, a valve member having spools for simultaneously closing said inlets, one of said spools being the same size as one inlet, and the other spool being larger than the other inlet, said valve housing having two ports parallel connected, one directly and the other through resistance means to a first channel, and two ports parallel connected, one directly and the other through resistance means to a second channel, said resistance connected ports being on opposite sides of the first spool for connection to pressure upon incipient movement of the valve member, said direct connected ports being on opposite sides of the second spool for connection to the second pressure port upon sustained movement of the valve whereby slight reciprocation of the valve is permitted before connection of the second pressure port to a pressure inlet.

7. A sensitive control mechanism for a machine tool or the like including a valve housing having a bore to receive a slidable tracer valve element, a valve slidably mounted in the bore of the housing, and a tracer element carried by the housing for movement relative thereto, said tracer element having a portion reactable on the valve for determining the variable incremental positionings thereof, and a hydraulic actuating circuit controllable by the valve including a pressure supply conduit, the housing having a pair of axially spaced pressure inlet ports coupled with said conduit, an exhaust conduit, the housing having a first exhaust port intervening the spaced pressure inlet ports and coupled with said exhaust conduit, additional exhaust ports opening into the bore at points axially remote as respects the pressure inlet ports, the valve having a pair of pressure port inlet control spools spaced to register with the respective pressure inlet ports when the valve is in an intermediate position, one of said spools being of substantially the same width as its registering inlet port and the other of said spools having a width slightly in excess of that of its registering inlet port, a first pair of work conduit ports formed in the housing in spanning relation to one of the pressure ports and a second pair of work conduit ports formed in the housing in spanning relation to the other of said pressure inlet ports, conduit means coupling one work conduit port of each pair with a respective work conduit port of the other pair, and resistance means in each of the conduits from the ports spanning the first pressure inlet port to retard of pressure medium in either direction through said conduits.

WENDELL I. EVANS.

REFERENCES CITED

The following references are of record in the file of this patent:

UNITED STATES PATENTS

| Number | Name | Date |
|---|---|---|
| 1,959,178 | Sassen | May 15, 1934 |
| 2,157,240 | Keel | May 9, 1939 |
| 2,241,077 | Thoma | May 6, 1941 |
| 2,332,533 | Roehm | Oct. 26, 1943 |
| 2,365,748 | Curtis | Dec. 26, 1944 |